US009802543B2

(12) United States Patent
Lu

(10) Patent No.: US 9,802,543 B2
(45) Date of Patent: Oct. 31, 2017

(54) AUTOMOBILE AND METHOD FOR AUTOMATICALLY ADJUSTING REARVIEW MIRROR

(71) Applicant: HON HAI PRECISION INDUSTRY CO., LTD., New Taipei (TW)

(72) Inventor: Pen-Uei Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 234 days.

(21) Appl. No.: 14/687,645

(22) Filed: Apr. 15, 2015

(65) Prior Publication Data
US 2016/0185295 A1 Jun. 30, 2016

(30) Foreign Application Priority Data

Dec. 29, 2014 (TW) .............................. 103146166 A

(51) Int. Cl.
*H04N 7/18* (2006.01)
*B60R 1/02* (2006.01)
*B60R 1/12* (2006.01)
*G06K 9/00* (2006.01)
*B60R 1/08* (2006.01)

(52) U.S. Cl.
CPC .............. *B60R 1/025* (2013.01); *B60R 1/087* (2013.01); *B60R 1/12* (2013.01); *G06K 9/00604* (2013.01); *G06K 9/00617* (2013.01); *G06K 9/00845* (2013.01); *B60R 2001/1223* (2013.01); *B60R 2001/1253* (2013.01)

(58) Field of Classification Search
CPC ..................................... G02N 5/08; B60R 1/06
USPC .......................................... 348/110–117, 148
See application file for complete search history.

(56) References Cited

U.S. PATENT DOCUMENTS 5,993,015 A * 11/1999 Fredricks .................. B60R 1/02
359/839

FOREIGN PATENT DOCUMENTS

| CN | 102785617 A | 11/2012 |
| CN | 203713705 U | 7/2014 |
| WO | 96/16838 A1 | 6/1996 |

* cited by examiner

*Primary Examiner* — Andy Rao
(74) *Attorney, Agent, or Firm* — Steven Reiss

(57) ABSTRACT

An automobile includes a rearview mirror, a motor electrically coupled to the rearview mirror, an image capturing unit configured to capture a number of images of a face of a driver in real time, a light detecting unit configured to detect light on the rearview mirror, a storage unit configured to store a preset value of light intensity, and a processing unit configured to execute an automatic adjusting system to adjust a position of the rearview mirror when one of a number of conditions is met. The number of conditions include a position of eyes of the driver changes, and light exceeding the preset value of intensity enters into the eyes of the driver.

17 Claims, 5 Drawing Sheets

AUTOMOBILE AND METHOD FOR AUTOMATICALLY ADJUSTING REARVIEW MIRROR

FIELD

The subject matter herein generally relates to automobiles, and more particularly to an automobile and a method for automatically adjusting a position of a rearview mirror of the automobile.

BACKGROUND

Generally, a rearview mirror of an automobile needs to be manually adjusted to a proper position by a driver of the automobile. When a position of eyes of the driver changes or when light reflected off of the rearview mirror enters into the eyes of the driver, the driver may need to manually readjust the position of the rearview mirror.

BRIEF DESCRIPTION OF THE DRAWINGS

Implementations of the present technology will now be described, by way of example only, with reference to the attached figures.

DETAILED DESCRIPTION

Figure 1:
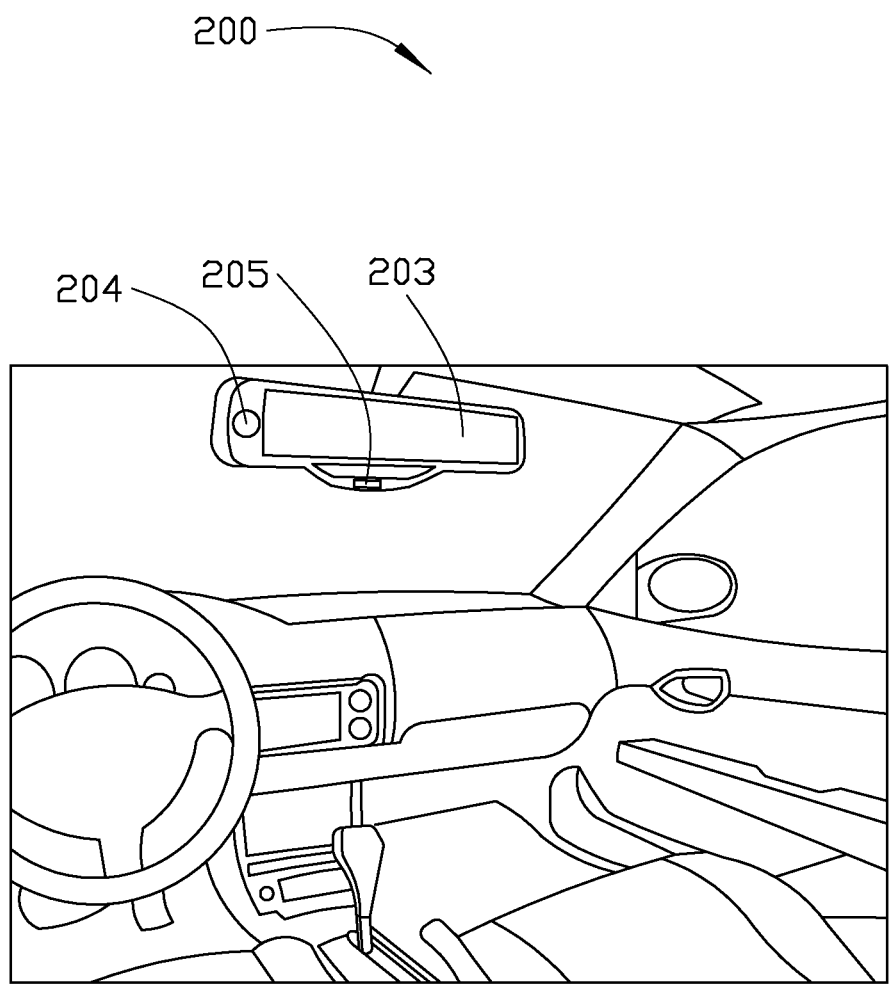
FIG. 1 is a diagrammatic view of an embodiment of an automobile.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of an automobile 200. The automobile 200 may include a rearview mirror 203 electrically coupled to a motor 208 (shown in FIG. 2). The automobile 200 may automatically adjust a position of the rearview mirror 203 when one of a plurality of conditions is met. The automobile 200 may further include an image capturing unit 204 and a light detecting unit 205. The image capturing unit 204 and the light detecting unit 205 may both be located on the rearview mirror 203. The image capturing unit 204 may capture a plurality of images in real time of a face of a driver of the automobile 200. The plurality of images may be still images or frames of a video. The image capturing unit 204 may generate a first signal corresponding to the plurality of images. The light detecting unit 205 may detect light on the rearview mirror 203. The light detecting unit 205 may generate a second signal corresponding to the light on the rearview mirror 203.

Figure 2:
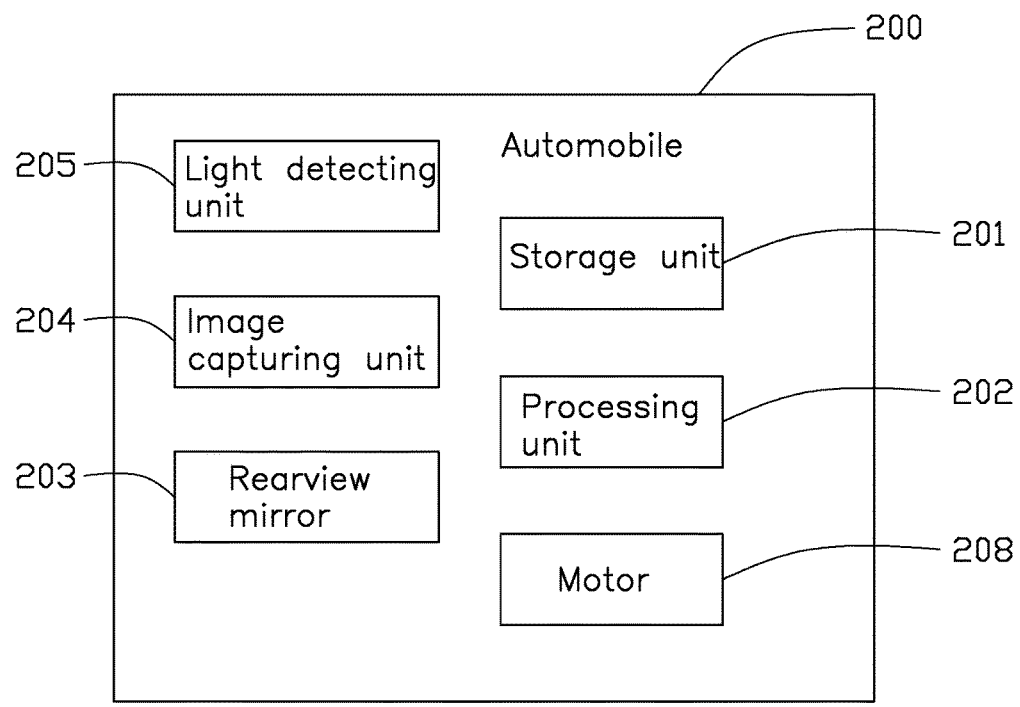
FIG. 2 is a block diagram of the automobile of FIG. 1.

Referring to FIG. 2, the automobile 200 may further include a storage unit 201 and a processing unit 202. The processing unit 202 may be electrically coupled to the storage unit 201, the image capturing unit 204, the light detecting unit 205, and the motor 208. The storage unit 201 may store a preset value of light intensity and store the first and second signals. The processing unit 202 may execute a plurality of modules of an automatic adjusting system 100 (shown in FIG. 3) for automatically adjusting the position of the rearview mirror 203 when one of the plurality of conditions is met. In at least one embodiment, the plurality of conditions includes a position of eyes of the driver changes, and light exceeding the preset value of light intensity enters into the eyes of the driver.

Figure 3:
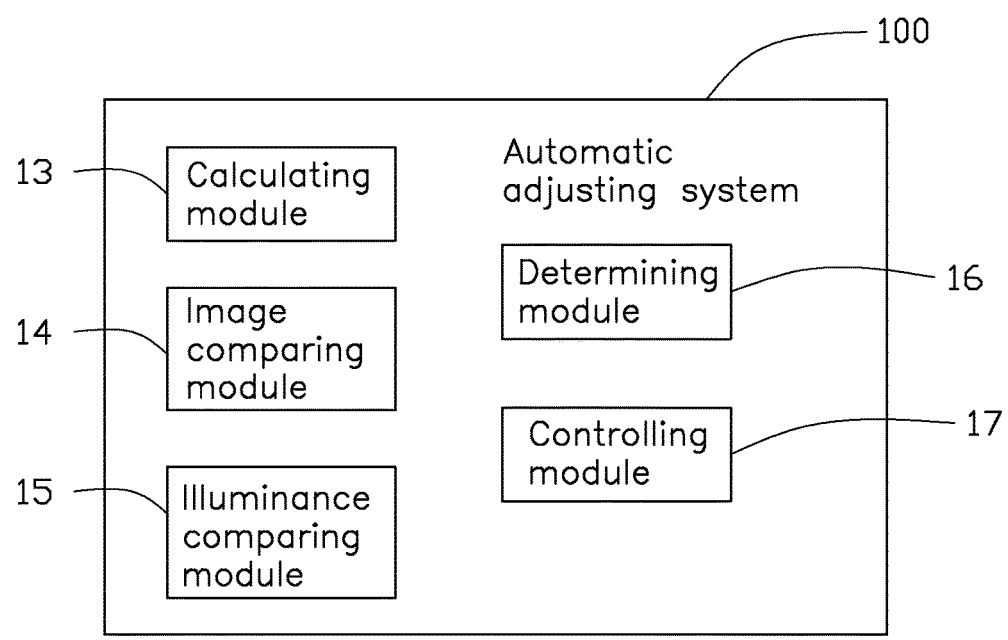
FIG. 3 is a block diagram of function modules of an automatic adjusting system of the automobile.

Referring to FIG. 3, the plurality of modules of the automatic adjusting system 100 may include a calculating module 13, an image comparing module 14, an illuminance comparing module 15, a determining module 16, and a controlling module 17. The modules 13-17 may include one or more software programs in the form of computerized codes stored in the storage unit 201. The computerized codes may include instructions executed by the processing unit 202 to provide functions for the modules 13-17.

The calculating module 13 may calculate, from the first signal, a position of the eyes of the driver from each of the plurality of images. The calculating module 13 may also calculate, from the second signal, an incident angle of the light on the rearview mirror 203, an angle of reflection of the light from the rearview mirror 203, and an intensity of the light on the rearview mirror 203.

The image comparing module 14 may compare, according to the first signal, every two successive images of the driver's face, and determine whether the position of the eyes has changed.

The illuminance comparing module 15 may compare, according to the second signal, whether the intensity of the light on the rearview mirror 203 is greater than the preset value.

The determining module 16 may determine, according to the position of the eyes of the driver and the angle of reflection of the light, whether the light reflected off of the rearview mirror 203 enters into the eyes of the driver. In at least one embodiment, the determining module 16 determines whether the light enters into the eyes of the driver when the intensity of the light on the rearview mirror 203 is greater than the preset value.

The controlling module 17 may adjust the position of the rearview mirror 203 when one of the plurality of conditions is met. In at least one embodiment, when the position of the eyes of the driver changes, the controlling module 17 may control the rearview mirror 203 to change by a same angle and in a same direction as the eyes of the driver. The position of the eyes of the driver may be determined to have changed when the position of the eyes of the driver in two successive images is different. When light having an intensity greater than the preset value enters into the eyes of the driver and the position of the eyes does not change, the controlling module 17 may adjust the position of the rearview mirror in any direction until the light does not enter into the eyes of the driver. When the position of the eyes of the driver changes, the controlling module 17 may adjust the position of the rearview mirror accordingly.

In other embodiments, the image capturing unit 204 and the light detecting unit 205 may be located elsewhere in the automobile 200 instead of on the rearview mirror 203.

Figure 4:
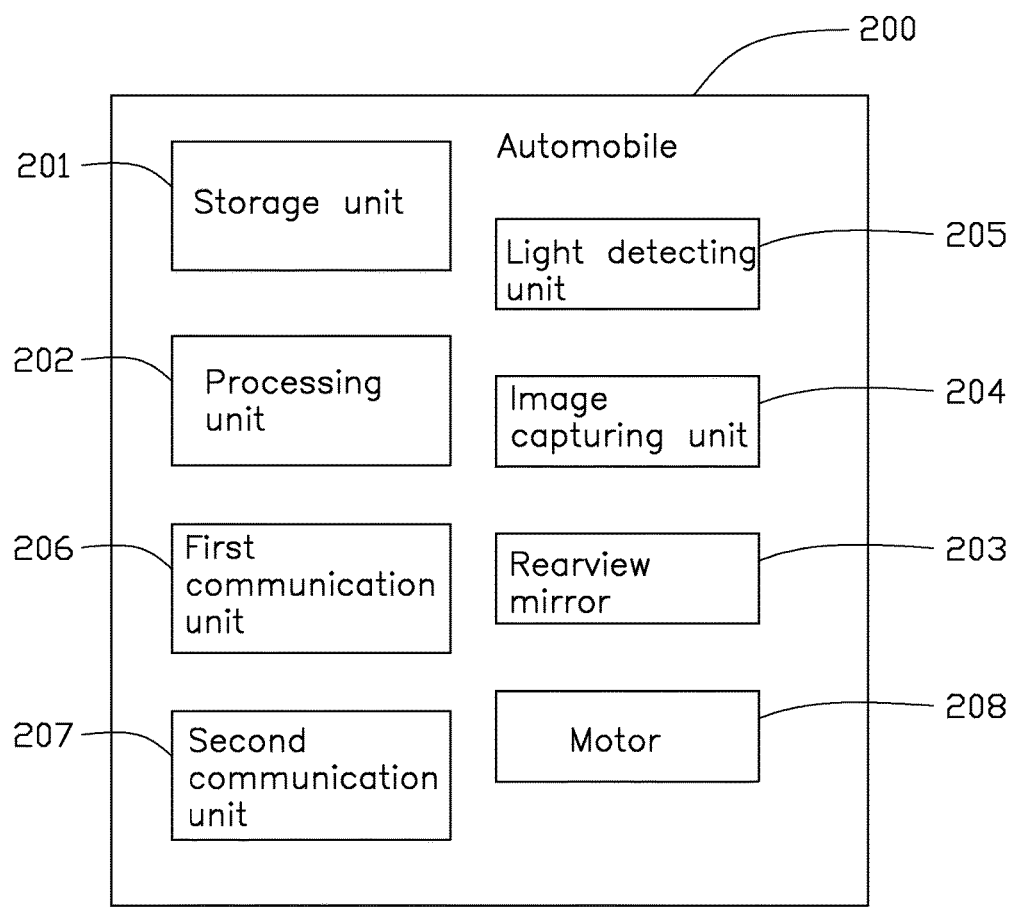
FIG. 4 is a block diagram of a second embodiment of the automobile.

FIG. 4 illustrates a second embodiment of the automobile 200. The second embodiment is substantially the same as the first embodiment, except that the automobile 200 may further include a first communication unit 206 and a second communication unit 207. The image capturing unit 204 and the light detecting unit 205 may be electrically coupled to the first communication unit 206. The processing unit 202 may be electrically coupled to the second communication unit 207. The first communication unit 206 may be wirelessly coupled to the second communication unit 207. Thus, the image capturing unit 204 and the light detecting unit 205 may send the first and second signals, respectively, to the processing unit 202 wirelessly by sending the first and second signals from the first communication unit 206 to the second communication unit 207.

Figure 5:
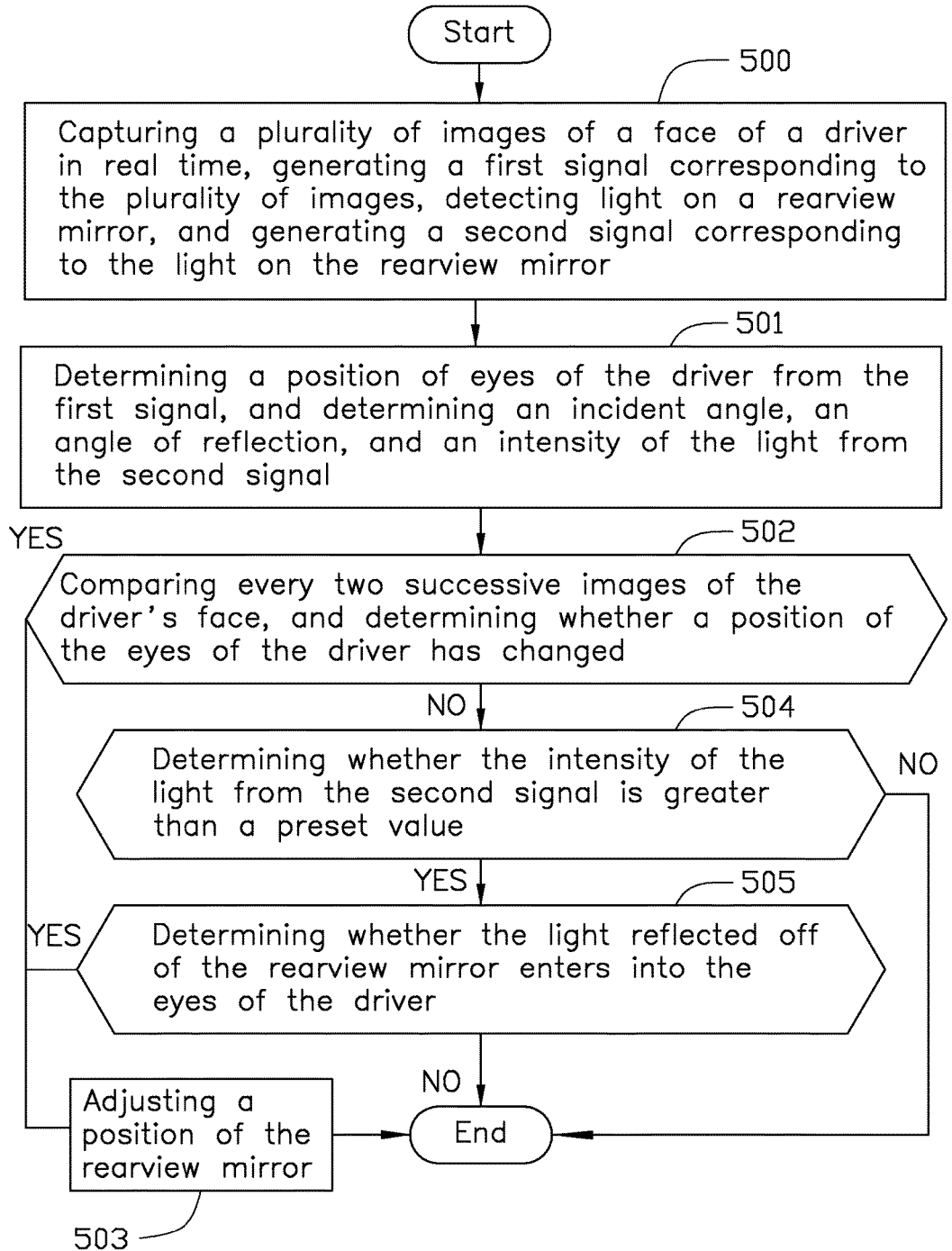
FIG. 5 is a flowchart diagram of a method for automatically adjusting a rearview mirror of an automobile.

FIG. 5 illustrates a flowchart of an exemplary method for adjusting a rearview mirror of an automobile. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 500.

At block 500, a plurality of images of a face of a driver may be captured in real time, and light on the rearview mirror may be detected. A first signal corresponding to the plurality of images may be generated, and a second signal corresponding to the light on the rearview mirror may be generated.

At block 501, a position of eyes of the driver may be determined from the first signal, and an incident angle, an angle of reflection, and an intensity of the light may be determined from the second signal.

At block 502, every two successive images of the driver's face may be compared to determine whether a position of the eyes of the driver has changed. When it is determined that the position of the eyes of the driver has changed, block 503 is implemented. Otherwise, block 504 is implemented.

At block 503, a position of the rearview mirror may be automatically adjusted. In one embodiment, the rearview mirror is adjusted by a same angle and direction as the change in position of the eyes of the driver.

At block 504, the intensity of the light corresponding to the second signal may be compared to a preset value. When the intensity of the light is greater than the preset value, block 505 is implemented. Otherwise, the method ends.

At block 505, whether the light reflected off of the rearview mirror enters into the eyes of the driver is determined, according to the position of the eyes of the driver and the angle of reflection of the light from the rearview mirror. When the light is determined to have entered into the eyes of the driver, block 503 is implemented. Otherwise, the method ends. In one embodiment, when light having an intensity greater than the preset value is determined to have entered into the eyes of the driver and the position of the eyes does not change, the rearview mirror is adjusted in any direction until the light does not enter into the eyes of the driver.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for automatically adjusting a rearview mirror of an automobile, the method comprising steps of:
   capturing, by an image capturing unit, a plurality of images of a driver's face in real time;
   detecting, by a light detecting unit, light on the rearview mirror;
   obtaining from each image, by a processing unit, a position of eyes of the driver;
   calculating from the light on the rearview mirror, by the processing unit, an incident angle of the light on the rearview mirror, an angle of reflection of the light from the rearview mirror, and an intensity of the light;
   comparing, by the processing unit, every two successive images of the driver's face, and determining whether the position of the eyes of the driver has changed;
   determining, by the processing unit, whether the intensity of the light is greater than a preset value;
   determining, by the processing unit and when the illuminance value of the light is greater than the preset value, and according to the angle of reflection of the light from the rearview mirror and the position of the eyes of the driver, whether the light reflected off of the rearview mirror enters into the eyes of the driver; and adjusting, by the processing unit, an angle of the rearview mirror when it is determined that either the position of the eyes of the driver has changed or that the light having an intensity greater than the preset value enters into the eyes of the driver;

wherein a first signal corresponding to the plurality of images is generated by the image capturing unit, and a second signal corresponding to the light is generated by the light detecting unit; the position of the eyes of the driver is determined from the first signal; and the incident angle of the light on the rearview mirror, the angle of reflection of the light from the rearview mirror, and the intensity of the light are calculated from the second signal.

2. The method as in claim 1, wherein the plurality of images is still images or frames of a video.

3. The method as in claim 1, wherein when the position of the eyes of the driver is determined to have changed, the rearview mirror is adjusted a same angle and direction as the eyes of the driver.

4. The method as in claim 1, wherein the position of the eyes of the driver is determined to have changed when a position of the eyes in the two successive images is different.

5. The method as in claim 1, wherein the first signal and the second signal are electrically sent to the processing unit.

6. The method as in claim 1, wherein the first signal and the second signal are wirelessly sent to the processing unit.

7. An automobile comprising:
a rearview mirror;
a motor electrically coupled to the rearview mirror and configured to adjust a position of the rearview mirror;
an image capturing unit configured to capture a plurality of images of a face of a driver in real time;
a light detecting unit configured to detect light on the rearview mirror;
a storage unit configured to store a preset value of light intensity, and further store a plurality of instructions of a plurality of modules of an automatic adjusting system; and
a processing unit configured to execute the plurality of instructions of the plurality of modules of the automatic adjusting system to adjust a position of the rearview mirror when one of a plurality of conditions is met,
wherein the plurality of conditions for adjusting the position of the rearview mirror comprises:
a position of eyes of the driver changes; and the light exceeding the preset value of light intensity enters into the eyes of the driver; the image capturing unit produces a first signal corresponding to the plurality of images of the driver's face; the light detecting unit produces a second signal corresponding to the light on the rearview mirror; the processing unit determines from the first signal whether the position of the eyes of the driver changes; and the processing unit determines from the second signal an incident angle of the light on the rearview mirror, an angle of reflection of the light from the rearview mirror, and an intensity of the light.

8. The automobile as in claim 7, wherein the first signal and the second signal are stored in the storage unit.

9. The automobile as in claim 7, wherein the plurality of modules of the automatic adjusting system comprises:
a calculating module configured to determine from the first signal the position of the eyes of the driver, and calculate from the second signal the incident angle, the angle of reflection, and the intensity of the light;
an image comparing module configured to compare, according to the first signal, every two successive images of the driver's face, and determine whether the position of the eyes of the driver has changed;
a light comparing module configured to compare, according to the second signal, whether the intensity of the light is greater than the preset value;
a determining module configured to determine, according to the angle of reflection of the light and according to the position of the eyes of the driver, whether the light enters into the eyes of the driver; and
a controlling module configured to control the motor to adjust the position of the rearview mirror when one of the plurality of conditions is met.

10. The automobile as in claim 9, wherein when the position of the eyes of the driver changes, the controlling module adjusts the rearview mirror by a same angle and direction as the eyes of the driver; and when the light having an intensity greater than the preset value enters into the eyes of the driver and the position of the eyes does not change, the controlling module adjusts the rearview mirror in any direction until the light does not enter into the eyes of the driver.

11. The automobile as in claim 7, wherein the position of the eyes of the driver is determined to have changed when the position of the eyes of the driver in the two successive images is different.

12. The automobile as in claim 7, wherein the plurality of images is still images or frames of a video.

13. The automobile as in claim 7, wherein the image capturing unit and the light capturing unit are located on the rearview mirror.

14. The automobile as in claim 7, wherein the image capturing unit and the light capturing unit are both electrically coupled to the processing unit, and the first signal and the second signal are sent electrically to the processing unit.

15. The automobile as in claim 7, wherein the automobile further comprises a first communication unit and a second communication unit; the image capturing unit and the light capturing unit are both electrically coupled to the first communication unit; the processing unit is electrically coupled to the second communication unit; and the first signal and the second signal are sent wirelessly to the processing unit by being sent from the first communication unit to the second communication unit.

16. A method for automatically adjusting a rearview mirror of an automobile, the method comprising steps of:
monitoring a driver's face in real time for changes in a position of eyes of the driver;
determining an incident angle of light on the rearview mirror, an angle of reflection of the light from the rearview mirror, and whether the light reflected off of the rearview mirror enters into the eyes of the driver;
determining whether an intensity of the light on the rearview mirror is above a preset value; and
adjusting a position of the rearview mirror in response to either the position of the eyes changing or the light having a light intensity higher than the preset value reflects off the rearview mirror into the eyes of the driver.

17. The method as in claim 16, wherein the driver's face is monitored by a camera capturing a plurality of images of the driver's face; every two consecutive images of the driver's face are compared to determine whether the position of the eyes of the driver has changed; when the position of the eyes of the driver has changed, the position of the rearview mirror is adjusted in a same angle and direction as the change in the eyes of the driver; when the light having the light intensity higher than the preset value shines into the eyes of the driver, the rearview mirror is adjusted in any direction.

\* \* \* \* \*